United States Patent
Dam

(10) Patent No.: US 8,117,218 B2
(45) Date of Patent: Feb. 14, 2012

(54) METHODS AND SYSTEMS FOR AUTOMATED DATA MAPPING AND ANALYSIS

(75) Inventor: Hien Duy Dam, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 472 days.

(21) Appl. No.: 12/277,119

(22) Filed: Nov. 24, 2008

(65) Prior Publication Data

US 2010/0131522 A1    May 27, 2010

(51) Int. Cl.
G06F 7/00 (2006.01)
G06F 17/30 (2006.01)
(52) U.S. Cl. ...................................... 707/756
(58) Field of Classification Search .......... 707/600–831; 702/5, 108, 119, 120, 122
See application file for complete search history.

(56) References Cited

U.S. PATENT DOCUMENTS

| | | | |
|---|---|---|---|
| 4,841,456 A * | 6/1989 | Hogan et al. ................. 702/119 |
| 6,681,197 B2 | 1/2004 | Brunner et al. |
| 6,751,553 B2 | 6/2004 | Young et al. |
| 7,321,310 B2 | 1/2008 | Curkendall et al. |
| 7,379,782 B1 | 5/2008 | Cocco |
| 7,400,976 B2 | 7/2008 | Young et al. |
| 7,426,520 B2 | 9/2008 | Gorelik et al. |
| 7,873,667 B2 * | 1/2011 | Lobo et al. ................. 707/793 |
| 2004/0215697 A1 | 10/2004 | Vergopoulos et al. |

OTHER PUBLICATIONS

Vitharana et al., Strategy-based design of reusable business components, Oct. 25, 2004, IEEE, 460-474.*

* cited by examiner

*Primary Examiner* — Jean B Fleurantin
(74) *Attorney, Agent, or Firm* — Armstrong Teasdale LLP

(57) ABSTRACT

A method for automated data mapping and analysis is described. The method includes receiving test data from a plurality of test objects at a data storage facility, selecting a test environment and analysis parameters from a user interface, retrieving a portion of the test data from the data storage facility based on the selected test environment and analysis parameters, ensuring the retrieved test data is in a common format, and analyzing the retrieved test data to generate at least one of a trending profile, an overlay profile, and a maintenance profile for the test objects for the selected analysis parameter.

21 Claims, 19 Drawing Sheets

METHODS AND SYSTEMS FOR AUTOMATED DATA MAPPING AND ANALYSIS

BACKGROUND

The field of the disclosure relates generally to data collection and analysis, and more specifically, to methods and systems for automated data mapping and analysis.

Generally, there are no automated methods for collecting and analyzing data associated with the testing of each individual unit within a product family for the purposes of improving the productivity of either the testing process or the manufacturing process. For example, at one satellite manufacturing facility, even though every individual satellite within a family is tested, and the test data stored, there is no method incorporated that uses the combined data from individual satellite tests to improve the productivity, and efficiency of testing of these satellites.

Without such procedures, it is more difficult for an enterprise to determine repeatability of the manufacturing processes and testing processes at either the unit level or the system level.

BRIEF DESCRIPTION

In one aspect, an automated data mapping and analysis method is provided. The method includes receiving test data from a plurality of test objects at a data storage facility, selecting a test environment and analysis parameters from a user interface, retrieving a portion of the test data from the data storage facility based on the selected test environment, ensuring the retrieved test data is in a common format, and analyzing the retrieved test data to generate at least one of a trending profile, an overlay profile, and a maintenance profile for the test objects for the selected analysis parameter.

In another aspect, a method for generating a trending profile for objects under test is provided. The method includes selecting and displaying object under test identifiers, test characterization identifiers, and trending test parameter identifiers, determining if data associated with an object under test, identified by a counter setting is available on a server in a common data format, extracting trending test parameters data for the object under test if the data is available on the server, and incrementing the counter if the data is not available on the server.

In still another aspect, a system for automated data mapping and analysis is provided. The system includes a computer having a user interface and a data storage facility communicatively coupled to the computer. The computer is programmed to receive test data from a plurality of test objects, store the test data within said data storage facility, receive, via said user interface, a user selection of a test environment and analysis parameters, retrieve a portion of the test data from said data storage facility, based on the selected test environment and analysis parameters, and analyze the retrieved test data to generate at least one of a trending profile, an overlay profile, and a maintenance profile for the test objects based on the selected analysis parameters.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings.

DETAILED DESCRIPTION

The described embodiments provide an automated method for mapping test data and/or operational data within a product family for purposes of mapping, trending, and analysis of the data. In other words, the described embodiments provide an automated method for acquiring and analyzing the data within a product family from a source data server that compares the data of each individual unit, or product, within a product family in order to improve the productivity, repeatability and efficiency of testing or manufacturing.

As further described herein, there are several unique features including automated collection of data, automated plotting of data for each product unit, automated overlay of data for selected objects within a product family, and an automated trending of data for selected units within a product family. The embodiments improve productivity, repeatability and efficiency of testing of manufacturing processes. The described elements include a source object (i.e. satellites, airplanes, tankers), a data server for storing and retrieval of, for example, testing data recorded in the manufacturing process and operational data recorded during operation of the product, as well as, automation, data mapping and analysis software.

Figure 1:
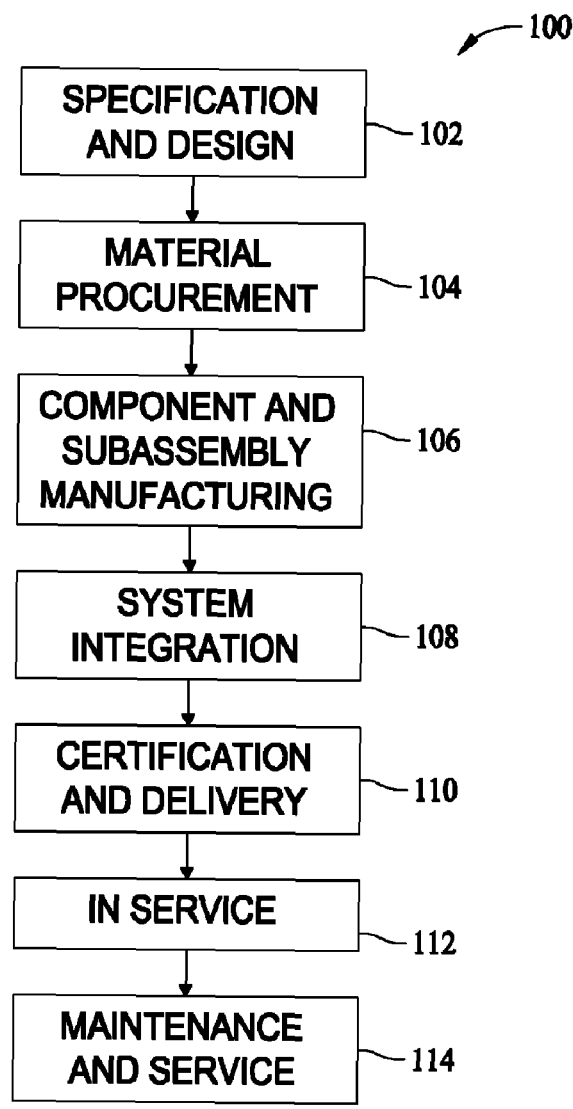
FIG. 1 is a flow diagram of an aircraft production and service methodology.
Figure 2:
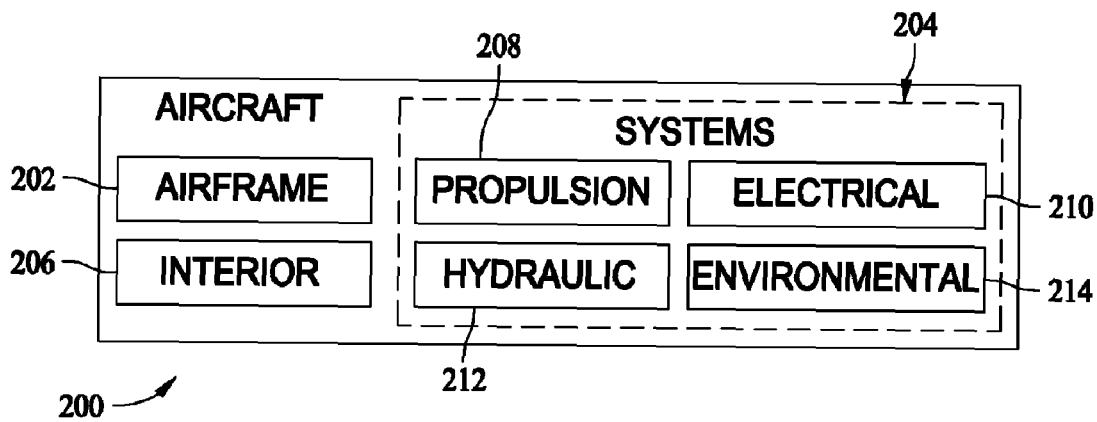
FIG. 2 is a block diagram of an aircraft.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
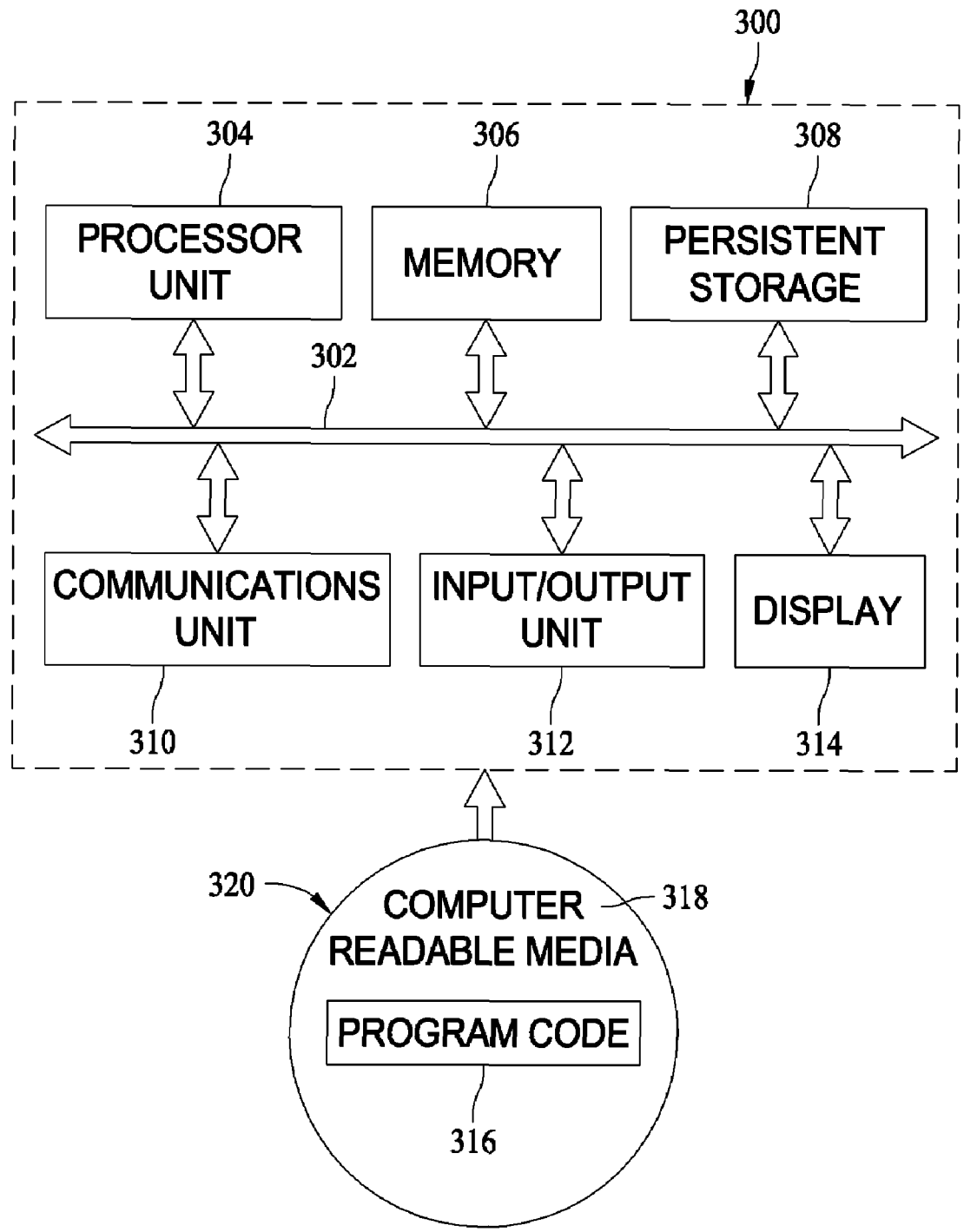
FIG. 3 is a diagram of a data processing system.

Turning now to FIG. 3, a diagram of a data processing system is depicted in accordance with an illustrative embodiment. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

Figure 4:
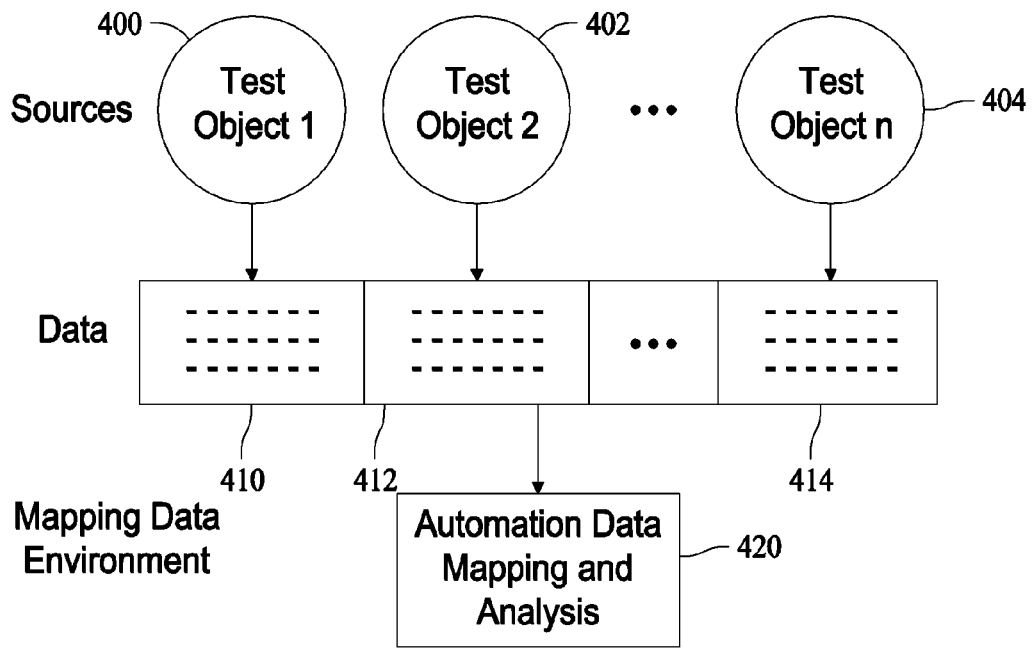
FIG. 4 illustrates collection of test data from a plurality of test objects into a data storage facility.

FIG. 4 illustrates collection of test data from a plurality of test objects 400, 402, and 404. Corresponding data 410, 412, and 414, from either one of or both of manufacturing tests and operational tests is provided to a data storage facility 420. In one embodiment, the data is mapped and analyzed within data storage and analysis facility 420 as further described herein. In the illustrated embodiment, the corresponding data 410, 412, and 414 includes, for example, header information such as test information name, object under test name, date and time, test environment, type of test, test data information such as measurement data record, and test status, to name a few. The preceding header information should not be considered exhaustive and should be only considered as examples.

Figure 5:
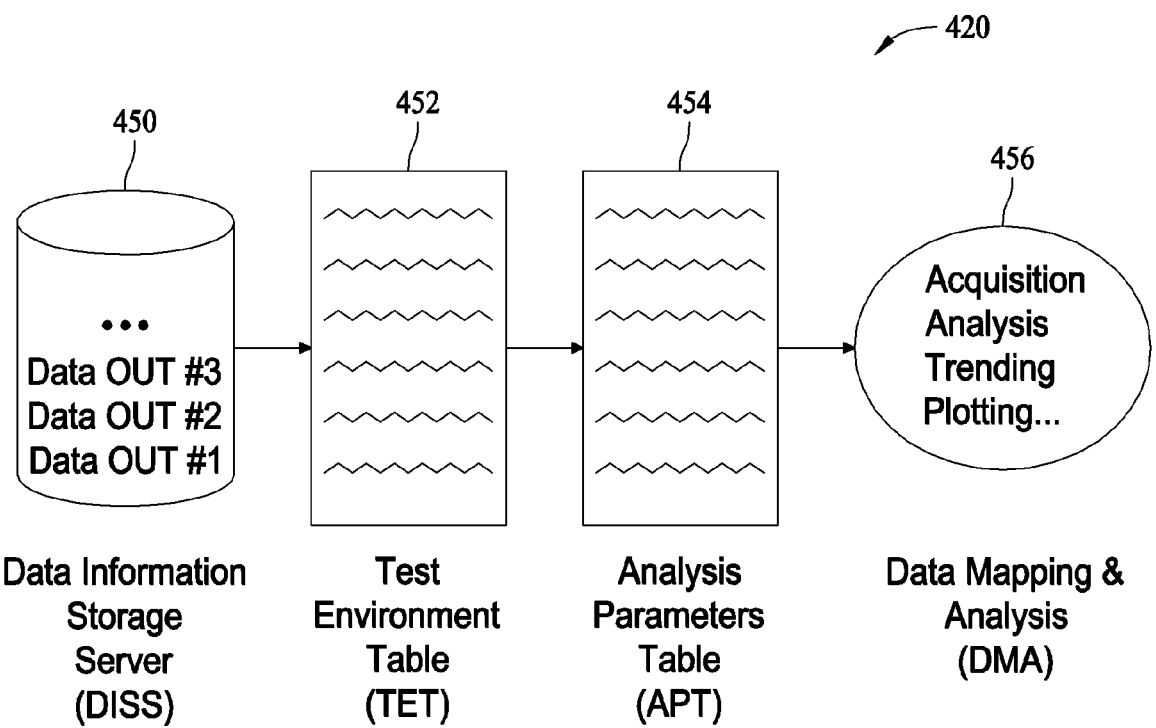
FIG. 5 illustrates one embodiment of the data storage facility of FIG. 4.
Figure 6:
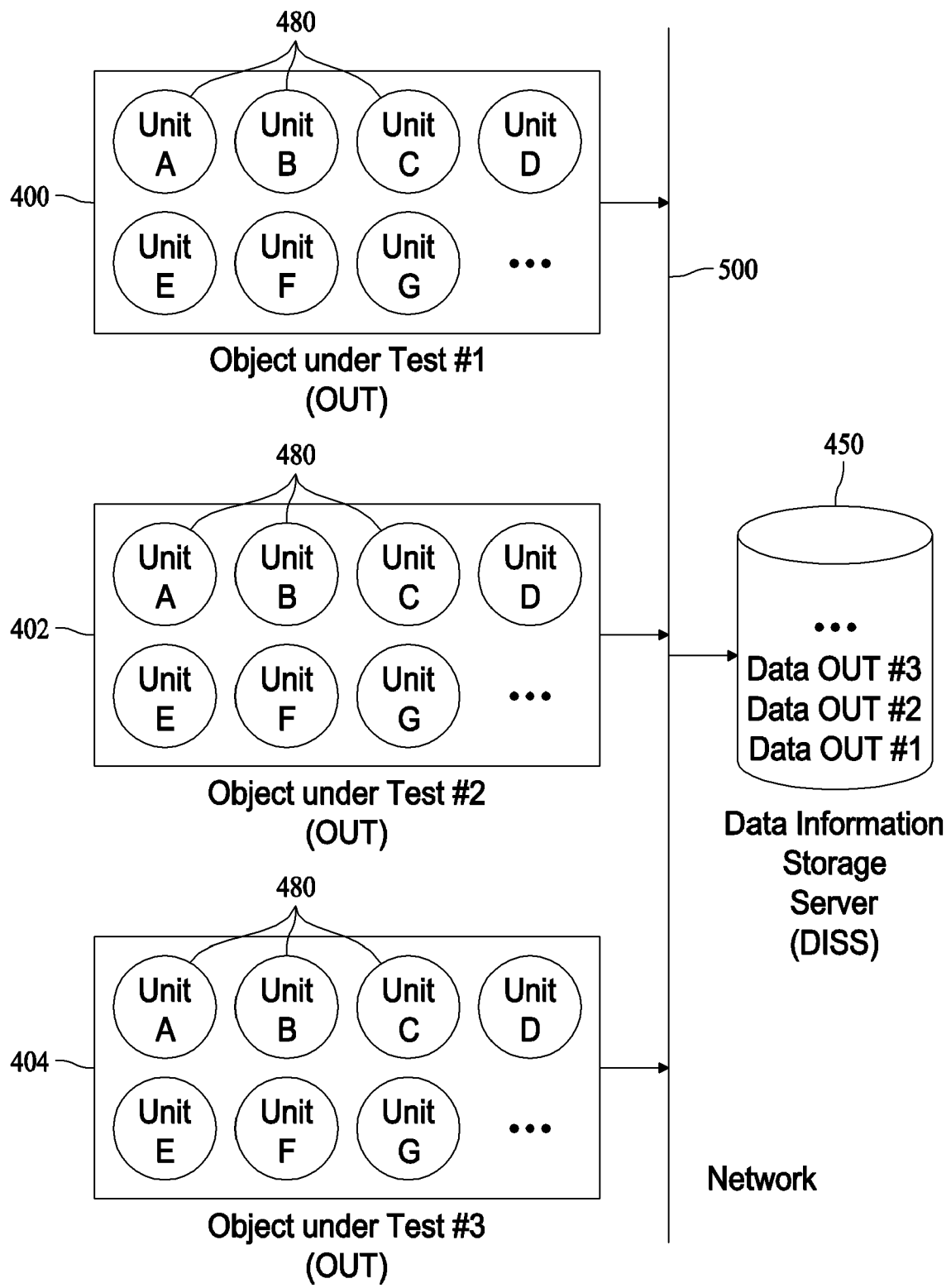
FIG. 6 illustrates that the objects under test of FIG. 4 may include multiple units therein.

FIG. 5 is one embodiment of the data storage facility 420 of FIG. 4. Data storage and analysis facility 420 includes a data storage server 450 that includes the data from the various objects that are under test (OUT). Such data is arranged according to a Test Environment table (TET) 452, and further analyzed according to an analysis parameters table (APT) 454. Upon completion of the data processing, a data mapping and analysis (DMA) module 456 is operable to acquire the processed data for further analysis such as trending and plotting, to name but a couple of examples. FIG. 6 illustrates that the objects under test of FIG. 4, test objects 400, 402, and 404 may include multiple units 480 therein. These units, labeled respectively as Unit A, B, C, D, E, F, and G may be operable such that they provide manufacturing test data and/or operational data directly that may be stored in data storage server 450. Of course, test objects that include fewer or more units 480 therein are contemplated as are fewer or more test objects. As such, the units labeled A, B, C, D, E, F, and G should not be considered exhaustive and should be only considered as examples.

FIG. 6 also illustrates that the data provided by the objects under test 400, 402, and 404 and the units 480 therein may be provided from remote locations, for example, operational data collected from various deployment locations of the objects. Each of the objects and the associated units are configured to provide the pertinent data to a network 500 that is operationally connected to the data storage server 450 mentioned above.

FIG. 6 also illustrates that the data provided by the various objects under test 400, 402, 404 contains all the data 480 associated with the respective object under test. The data provided by each unit in 480 includes, for example, header information such as test information name, object under test name, date and time, test environment, and type of test as well as test data information such as measurement data record and test status record. The preceding data listings should not be considered exhaustive and should be considered as examples only.

Figure 7:
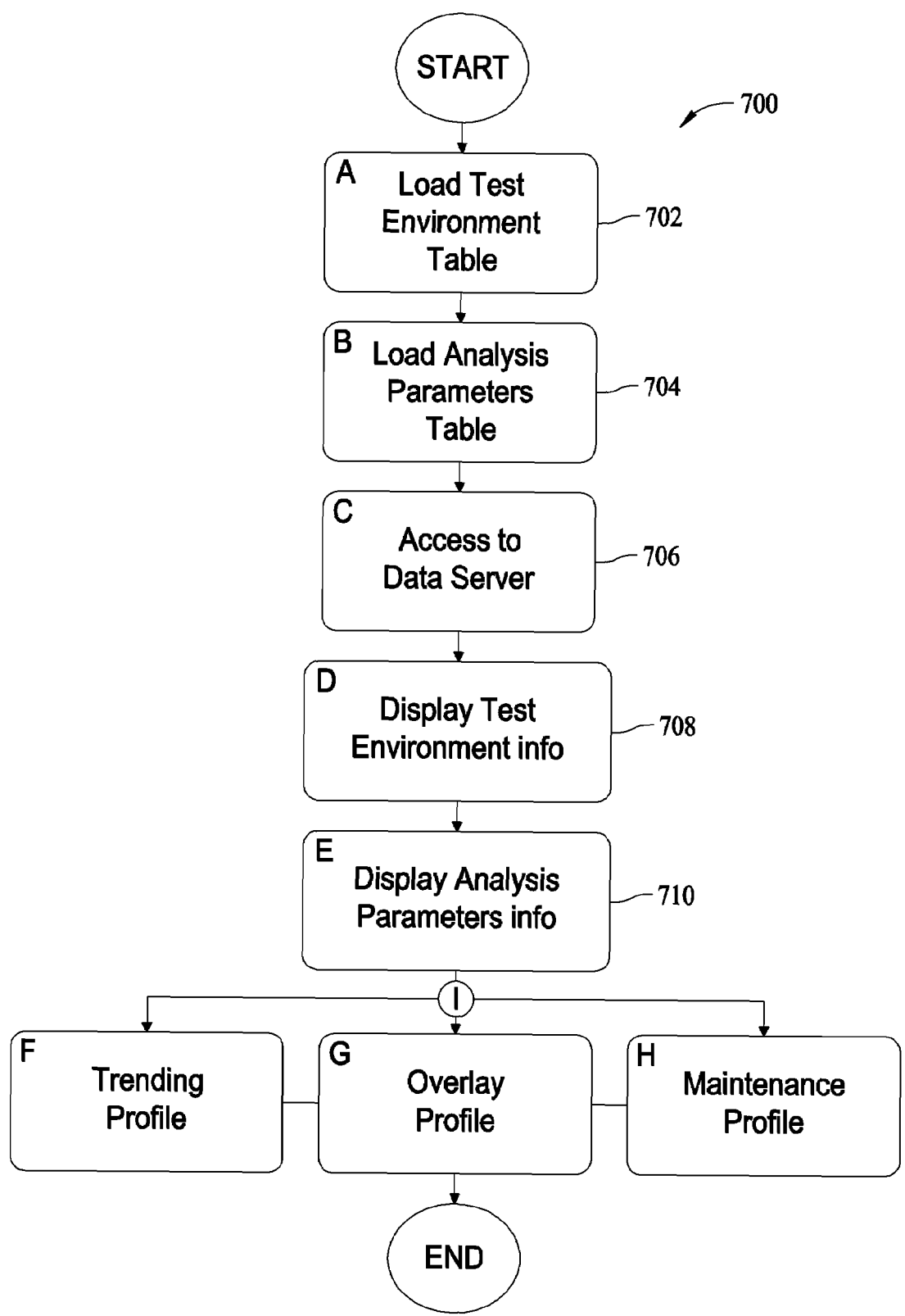
FIG. 7 is a high level flowchart illustrating an automated method for mapping test data and/or operational data within a product family.

FIG. 7 is a high level flowchart 700 illustrating an automated method for mapping test data and/or operational data within a product family for purposes of mapping, trending, and analysis of the data. Additional details are provided in FIGS. 8-21. Referring specifically to flowchart 700, a test environment table (TET) is loaded 702, and an analysis parameters table (APT) is loaded 704. A data server is accessed 706 to retrieve stored test data, test environment information is displayed 708, and analysis parameters information is displayed 710. Based on the above described data definitions, retrieved data and display parameters, at least one of a trending profile 720, an overlay profile 722, and a maintenance profile 724 can be generated. FIG. 7A is a Graphical User Interface for an automated method for mapping and analysis test data and/or operational data.

Figure 8:
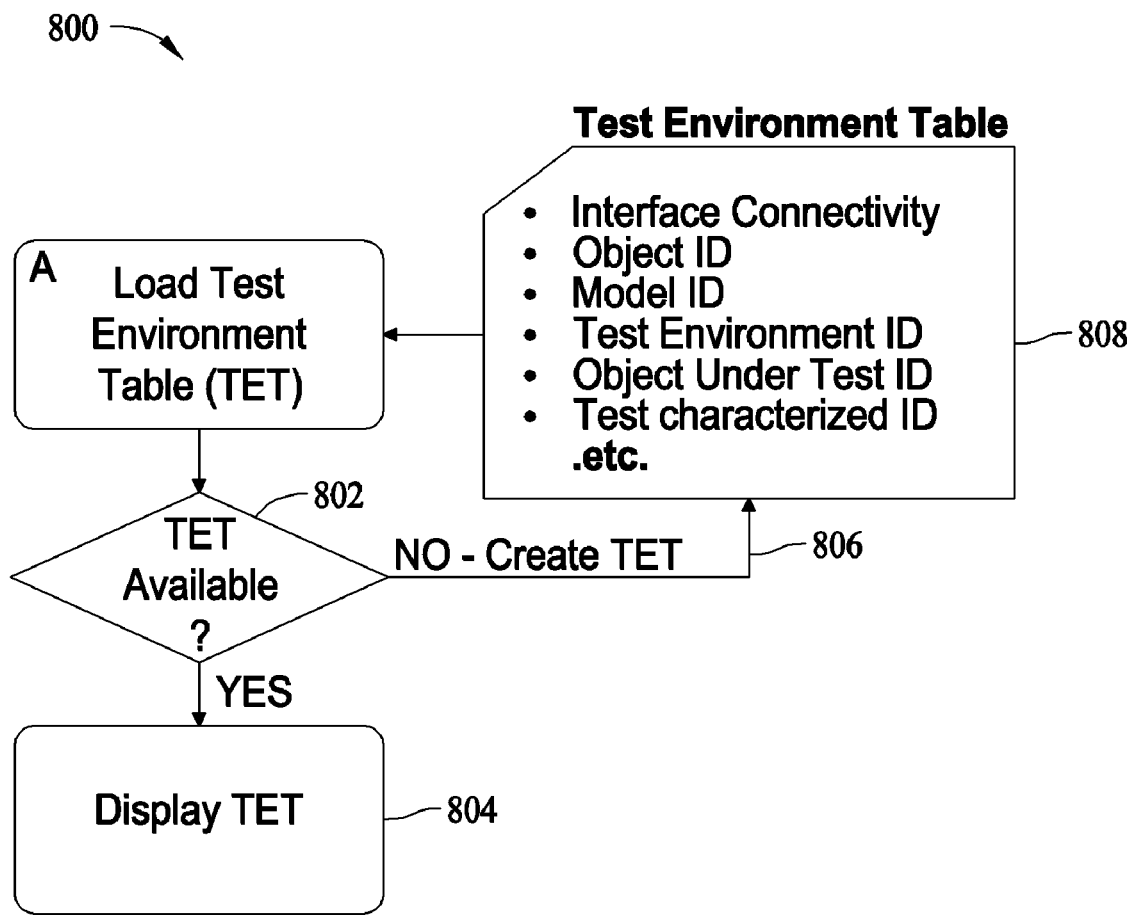
FIG. 8 is a flowchart detailing loading of a test environment table.

FIG. 8 is a flowchart 800 that provides further details into loading a test environment table. If a TET is available 802, it is loaded and displayed 804. If not, a TET is created 806 (See FIG. 11). In one embodiment, an exemplary TET 808 includes data relating to one or more of interface connectivity (an IP address of a data storage server), object under test identifiers (airplane, satellite, automobile, etc.), model identifiers (737, 787, X1, etc.), test environment identifiers (normal temperature, cold temperature, hot temperature, etc.), listing of object under test identifiers (how many objects are within a model family), test characterization identifiers (power measurement, temperature profile, etc.), and in certain embodiments may include an end of file identifier indicating that the loading operation has been completed. The preceding listings should not be considered exhaustive and should be only considered as examples. In one embodiment, the test environment table is displayed via a pull down menu or other user interface.

A test environment table is loaded by reading the information from the test environment into a computer memory location. In one example, the test environment table is a file that contains the test environment information and may be formatted according to one of ACCDB, standard ASCII, and Excel, to provide a couple of non-limiting examples. Each list item in the test environment table has several fields for user input, for example, interface connectivity has two fields, such as Interface ID and IP address. Continuing with the above example, an embodiment of an object under test identifier may include several fields such as: Object ID label, Number of object, Object ID #1, Object ID #2, Object ID #3 to name a few. A test environment identifier may also have several fields, depending on each object under test requirement. In one relevant example, a satellite testing program may include testing performed in several environments. Examples of such environments include: a payload module test environment, an initial vehicle test environment, a thermal vacuum test environment, a final test environment, and an in-orbit test environment. Examples of environments utilized in aircraft testing may include, for example, a wind tunnel test environment, a frame test environment, and a pressure test environment.

Figure 9:
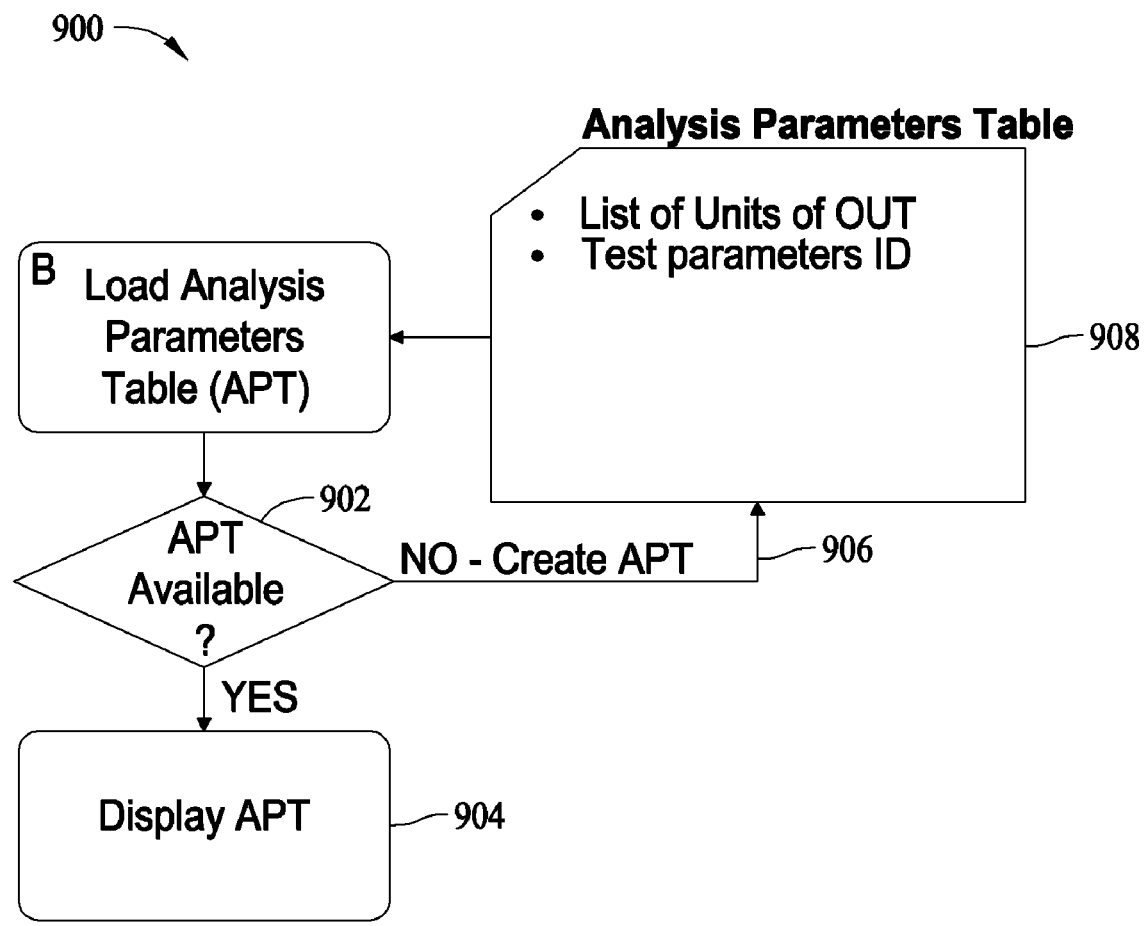
FIG. 9 is a flowchart detailing loading of an analysis parameters table.

FIG. 9 is a flowchart 900 that provides further details into loading an analysis parameters table. If an APT is available 902, it is loaded and displayed 904, for example, as described further with respect to FIG. 12. If not, an APT is created 906. In one embodiment, an exemplary APT 908 includes data relating to one or more of a list of units of objects under test (the sub units), test parameter identifiers (temperature, pressure, etc.), and in certain embodiments may include an end of file identifier indicating that the loading operation has been completed. Generally, this is the type of data a user wants to see for objects under test. The preceding list should not be considered exhaustive. In one embodiment, the analysis parameters table is displayed via a pull down menu or other user interface.

In one embodiment, an analysis parameters table is loaded by reading the information associated with analysis parameters into a computer memory location. In one example, the analysis parameters table is a file that contains the analysis parameters information that relate to, for example, an object under test and may be formatted according to one of ACCDB, standard ASCII, and Excel, to provide a couple of non-limiting examples. Each list item in the analysis parameters table has several fields for user input, for example, a listing of individual units of an object under test. Such a listing may have several fields, depending on each object under test requirement. In an aircraft testing environment, the units under test may include, for example, propulsion, electrical, hydraulic, etc. The test parameters identifier has several fields depending on each object under test requirement. One example set includes a test parameter ID label, a number of test parameters, test parameter ID #1, test parameter ID #2, test parameter ID #3, etc. Of course the preceding is but one example. Continuing with the above example, a test parameters ID generally includes a list of test parameters associated with a test parameter ID. For example, for a stress test ID, the list of test parameters may include pressure level parameters, pressure measurement parameters, etc.

One example of an analysis parameters table is provided by the following: Test Characterization ID #1: Name of test, Test Parameters ID #1: parameter1, paremeter2, parameter3, etc.; Test Characterize ID #2: Name of test, Test Parameters ID #2: parameter1, paremater2, parameter3, etc.; Test Characterize ID #3: Name of test, Test Parameters ID #3: parameter1, paremater2, parameter3, etc.

Figure 10:
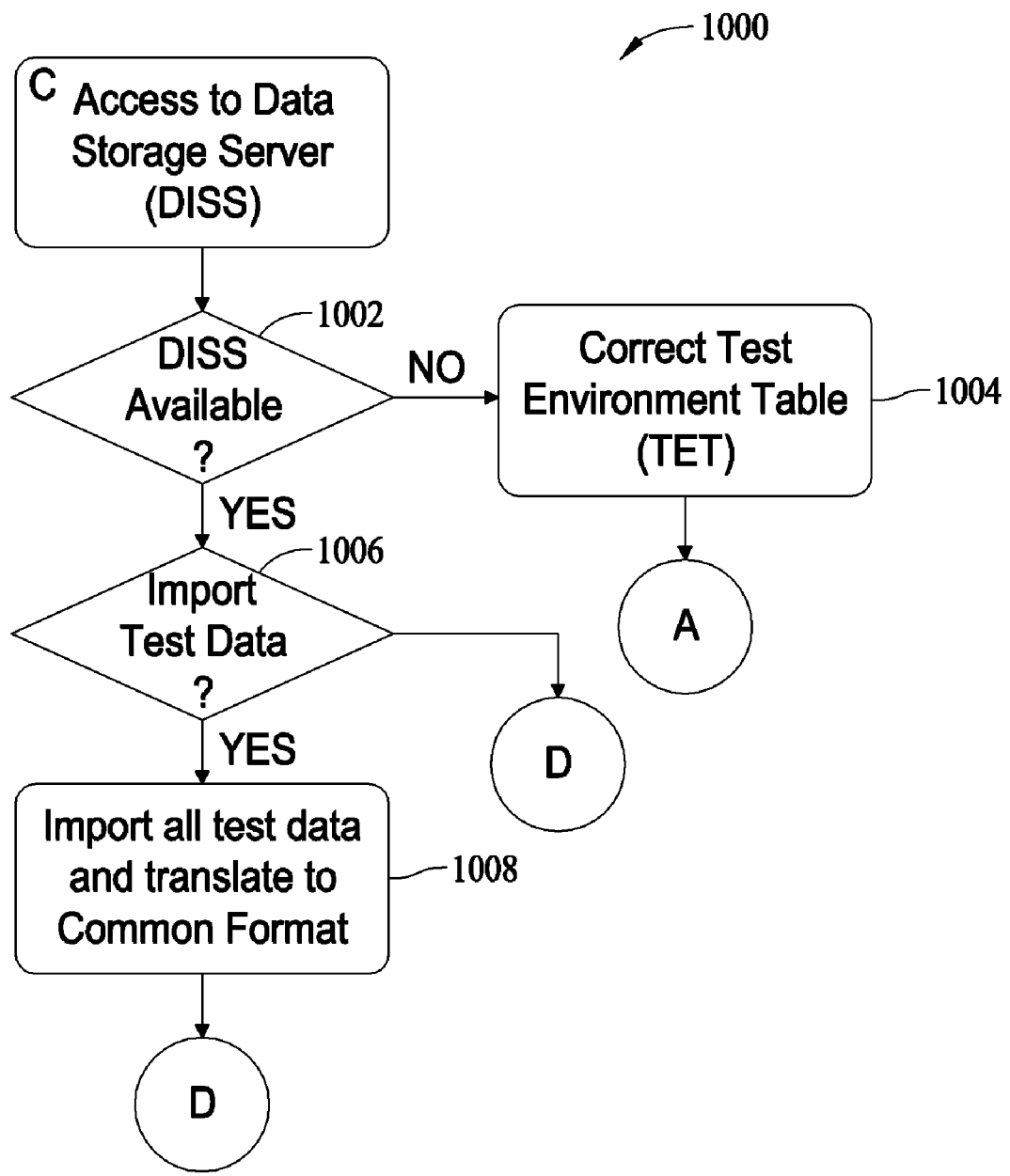
FIG. 10 is a flowchart detailing access into a data information storage server (DISS).
Figure 11:
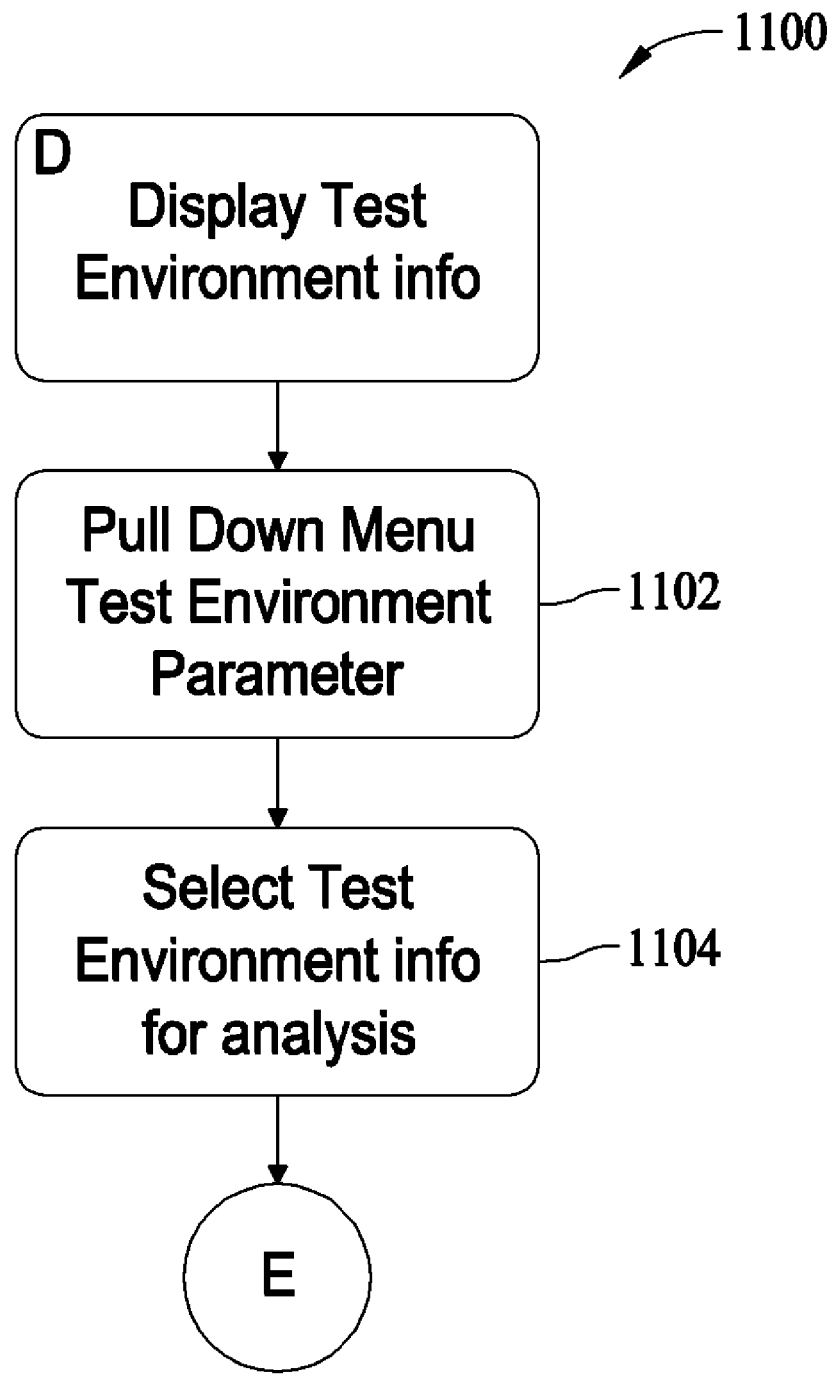
FIG. 11 is a flowchart detailing displaying of test environment information.

FIG. 10 is a flowchart 1000 that provides further details into accessing a data information storage server (DISS). If a DISS is not available 1002, the TET is corrected 1004 and the process associated with FIG. 8 is initiated. If a DISS is available 1002, the test data is imported 1006. It is appreciated that test data for a family of vehicles, such as satellites, may be taken at different times and locations using different test environment systems, and be stored in different data systems with different formats. Thus, the DMA module may include a data retrieval format translator to translate data obtained via the DISS to a common format for analysis as shown in step 1008. Then the process associated with FIG. 11 is initiated. If the test data not to be imported 1006, the process associated with FIG. 11 is initiated. File format supported by various DISSs include at least one of ORACLE, MySQL, ACCDB, standard ASCII, Excel to provide a couple of non-limiting examples. Importing 1006 of test data refers to system extraction of data files from the Data Information Storage Server (DISS) based on the information contained within the Test Environment Table (TET) and the Analysis Parameter Table (APT).

For example, the TET table may be used to specify a particular test environment of interest such as initial vehicle test, thermal vacuum test, in-orbit test, or any other test environment relevant to the vehicle. The TET may also contain information regarding the format of the storage of data for the particular test environment to facilitate the translation to a common format. In addition, the APT table may be used to specify the associated test parameters of interest of the test environment. Together, the TET and APT tables may be used as filters to extract and reformat only the data of interest from the DISS. If a decision is made to not import 1006 test data, it may be due to the DISS system checking a time stamp from the last import of data and a data file recorded timestamp. If the data file record timestamp is older then last recorded timestamp then a new data file is not recorded. The Test Environment Table can be corrected, in one embodiment, by opening the TET file and manually correcting the required parameters. In one embodiment, this is accomplished via a graphical user interface (see display 804 TET table in FIG. 8) through which changes to the current TET can be saved.

FIG. 11 is a flowchart 1100 that provides further details into displaying test environment information. In one embodiment, a test environment parameter is selected 1102 from a pull down menu or other user interface. Test environment information is then selected 1104 for analysis.

Figure 12:
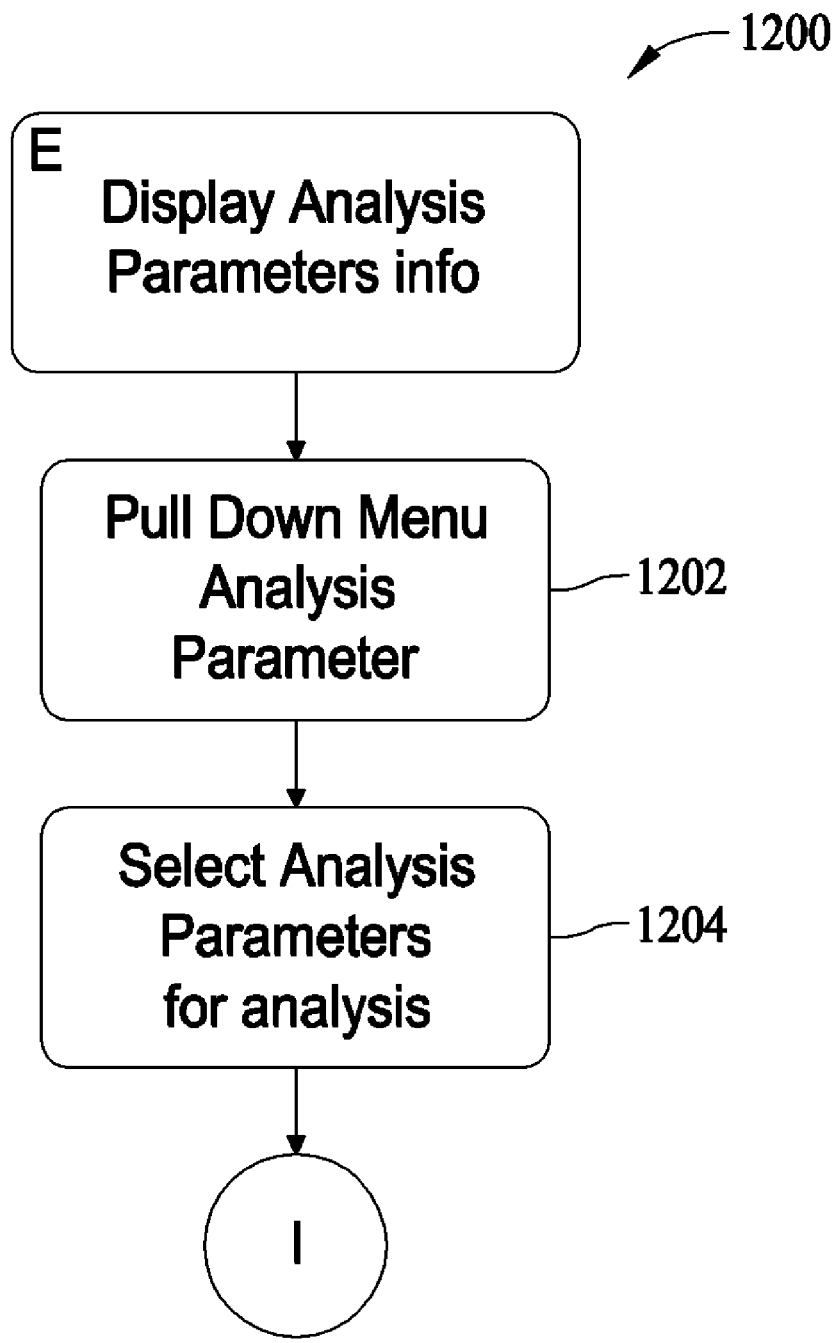
FIG. 12 is a flowchart detailing displaying of analysis parameters information.

FIG. 12 is a flowchart 1200 that provides further details into displaying analysis parameters information. In one embodiment, an analysis parameter is selected 1202 from a pull down menu or other user interface. Analysis is then performed 1204 using the selected parameters and one or more of a trending profile, an overlay profile, and a maintenance profile can then be performed.

For Data Mapping & Analysis (DMA) one embodiment incorporates web-based DMA system software including a Graphical User interface (GUI), a table driven architecture, and a data retrieval format translator to translate data obtained via the DISS to a common format. In one embodiment, the above described system is operable to display a list of "OBJECT" identifiers, display a list of "Units" of the selected Object, for example, via the serial number of the object, display a list of test identifiers, and display a list of test parameters from APT.

A user is able to select test parameter identifiers to display one or both of a trending data profile and an overlay data profile. The trending data profile is a comparison of the "golden data" from a previous object to that of a current object. The overlay data profile is a comparison of the golden data from the previous object to the current object. A user is able to generate report workbooks and graph windows.

The trending profile is also a comparison of the unit data in different test environments within object under test. In one example, a user can compare unit "A" data from a "normal temperature" test environment to the same unit "A" data for a "hot temperature" test environment. A user is able to generate report workbooks and graph windows. The overlay profile is also a comparison of the unit data in different test environments within the object under test. In one example, the user can compare unit "A" data from the "normal temperature" test environment to the same unit "A" data for a "hot temperature" test environment. A user is able to generate report workbooks and graph windows.

In a maintenance profile environment, DMA can be used for the scheduling of maintenance for objects such as airplanes, satellites, etc. In such an application, current maintenance test data on objects, for example, unit A, B, C, D, etc. can be retrieved. In addition, historical data, which is sometimes referred to as "Golden Data" for a specific object under test (OUT) can also be retrieved. In a trending and/or an overlay function, the maintenance data and the historical data can be compared. Other functions described herein include display status, profile plotting, generation of report workbooks, display of a Unit Under test (UUT) status as one of Pass, Fail, or Unsafe. Maintenance report profile can be selected and displayed. DMA can also be utilized, for example, with flight recorded data.

Figure 13:
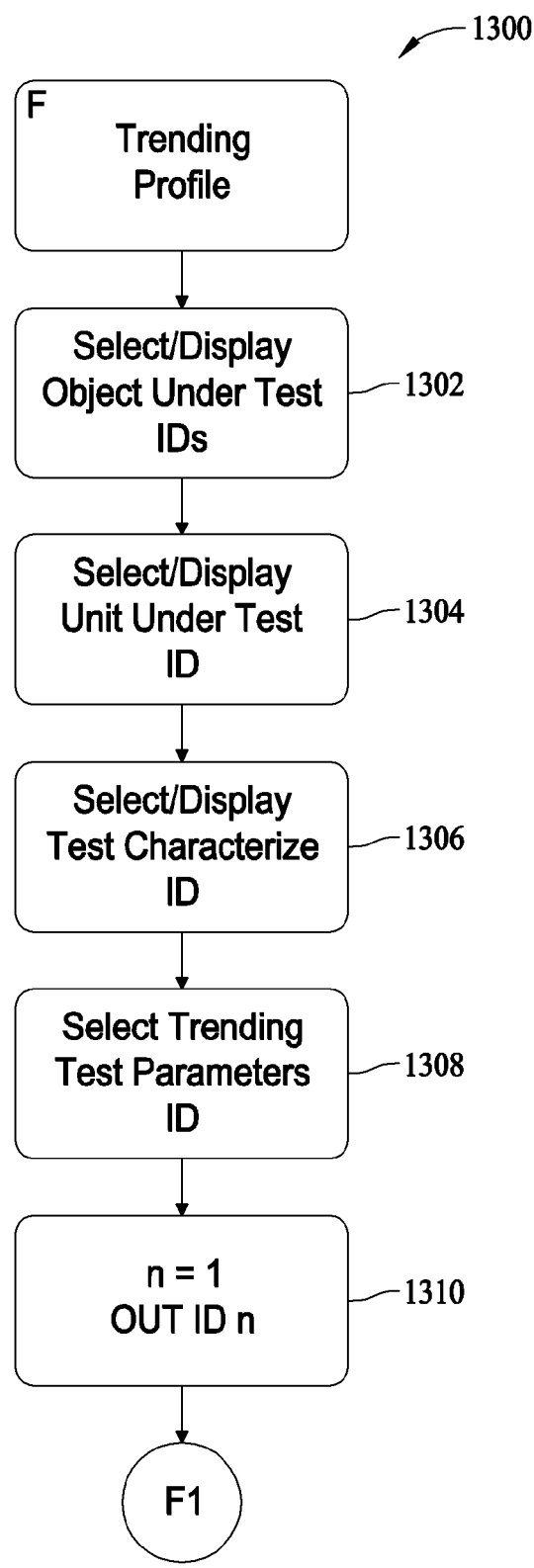
FIGS. 13-15 are flowcharts that illustrate one embodiment of a process for generating a trending profile.
Figure 14:
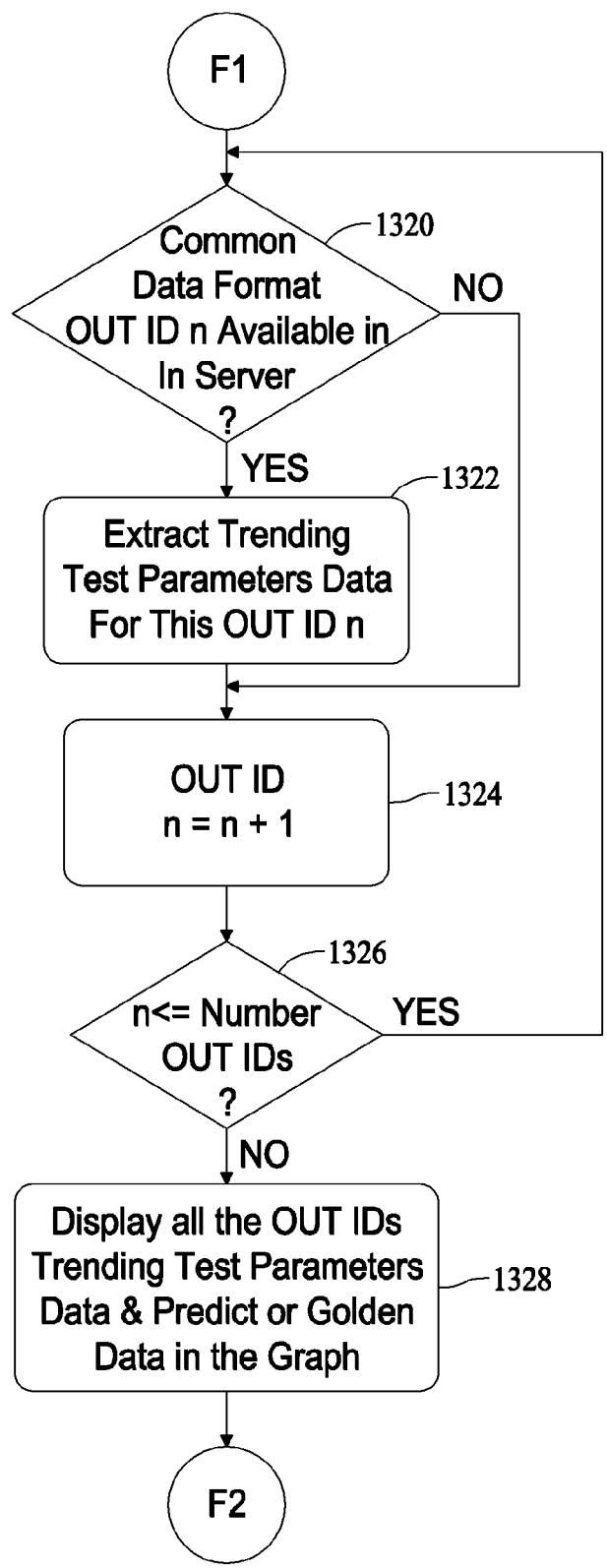
Figure 15:
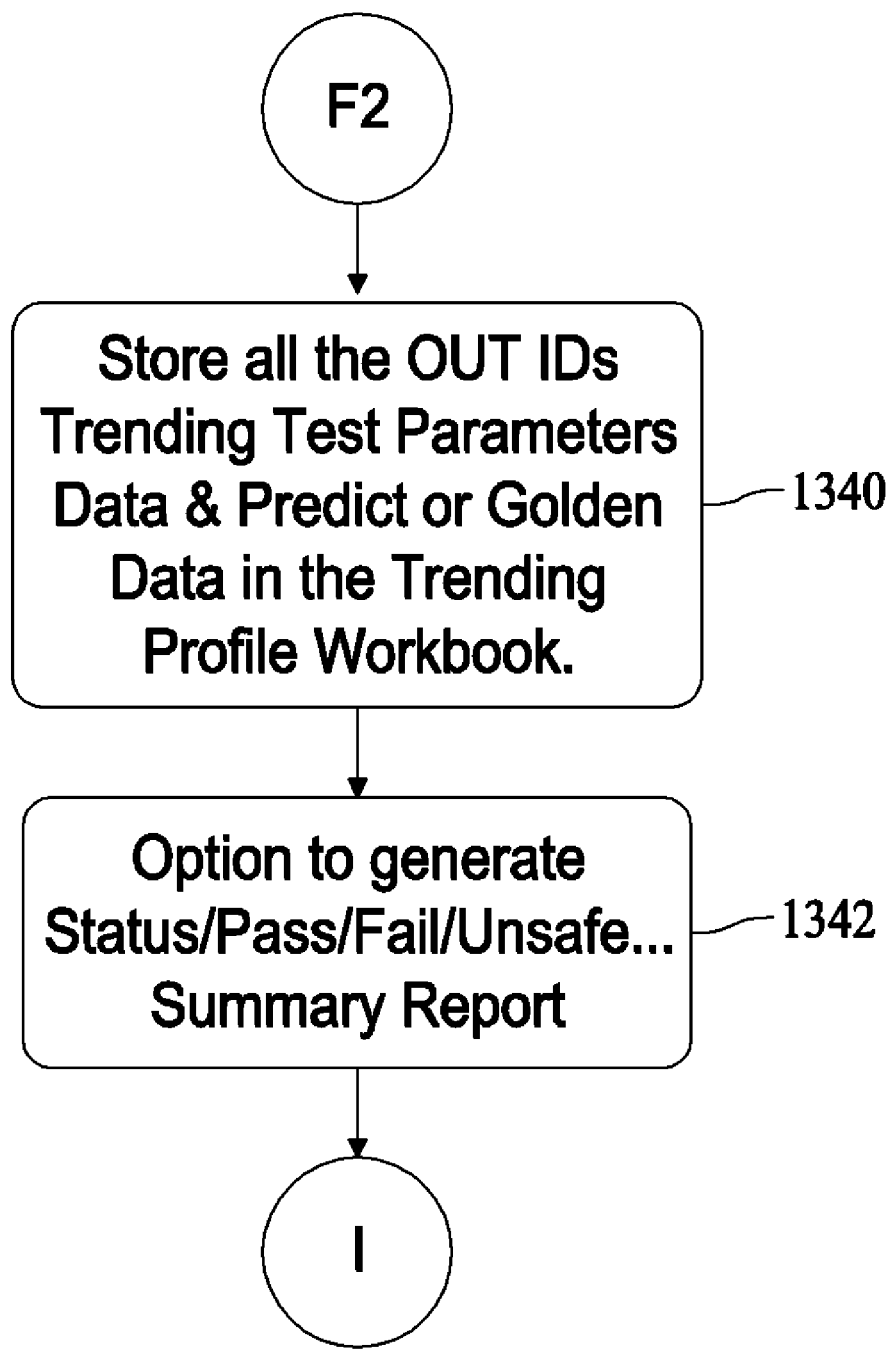

FIGS. 13-15 are flowcharts that illustrate one embodiment of a process 1300 for generating a trending profile. Referring to FIG. 13, object under test identifiers are selected 1302 and displayed, and unit under test identifiers are selected 1304 and displayed. Test characterization identifiers are selected 1306 and displayed, and trending test parameter identifiers are selected 1308 and displayed. A counter is set 1310 to one and is associated with the identifier for a first object under test.

Continuing to FIG. 14, a test is performed to determine if data associated with the object under test identified by the counter setting is available 1320 on the server in a common data format. If so, trending test parameters data is extracted 1322 for the object under test identified by the counter setting, then the counter setting is incremented 1324. If not, no data extraction occurs, and the counter setting is incremented 1324. A check is performed to determine 1326 if the counter setting is less than or equal to the number of object under test identifiers. If so, the previously described steps are repeated for the next object under test identifier. If not, the trending test parameters data is displayed 1328 for all the object under test identifiers from which a prediction regarding the trending test parameters data for future objects under test can be made or golden trending test parameter can be selected.

Now referring to FIG. 15, trending test parameters data is stored 1340 in a trending profile workbook for all the object under test identifiers as well as any predictions regarding the trending test parameters data for future objects under test and any selected golden trending test parameters. A user may then select 1342 to generate trending test summary reports for the objects under test including such information as status, pass, fail, unsafe, etc.

Figure 16:
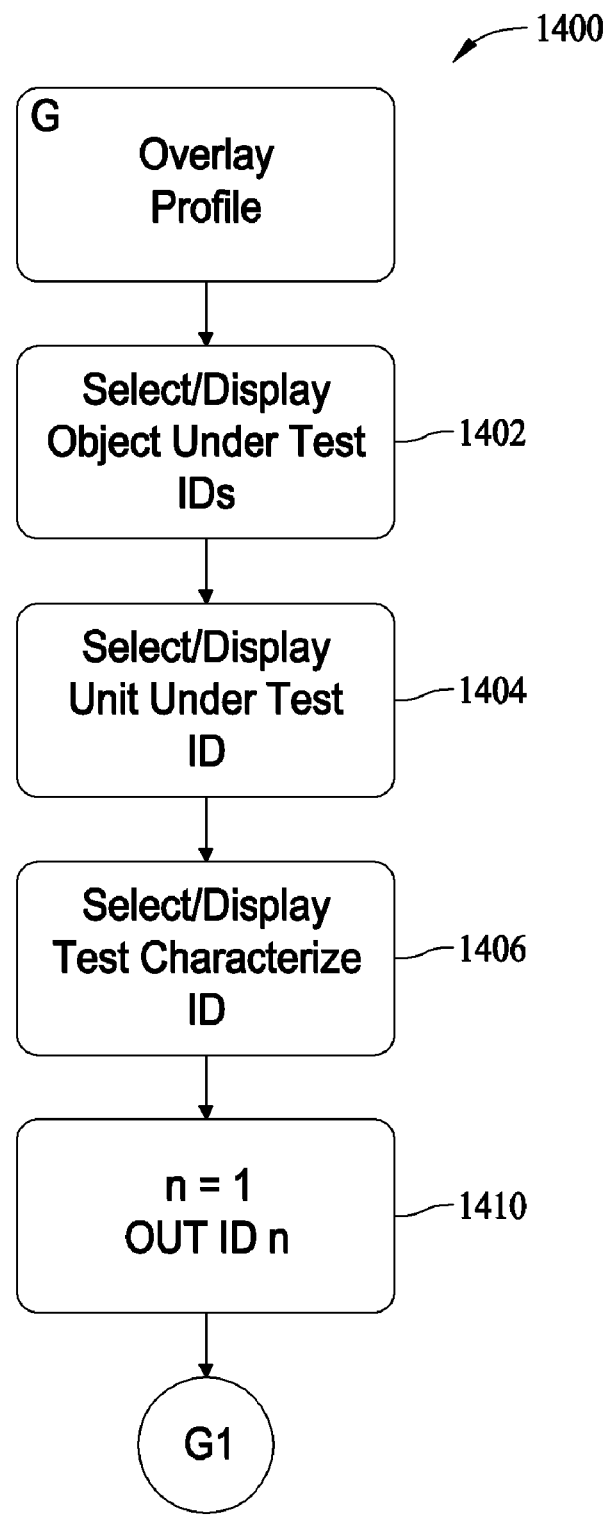
FIGS. 16-18 are flowcharts that illustrate one embodiment of a process for generating an overlay profile.
Figure 17:
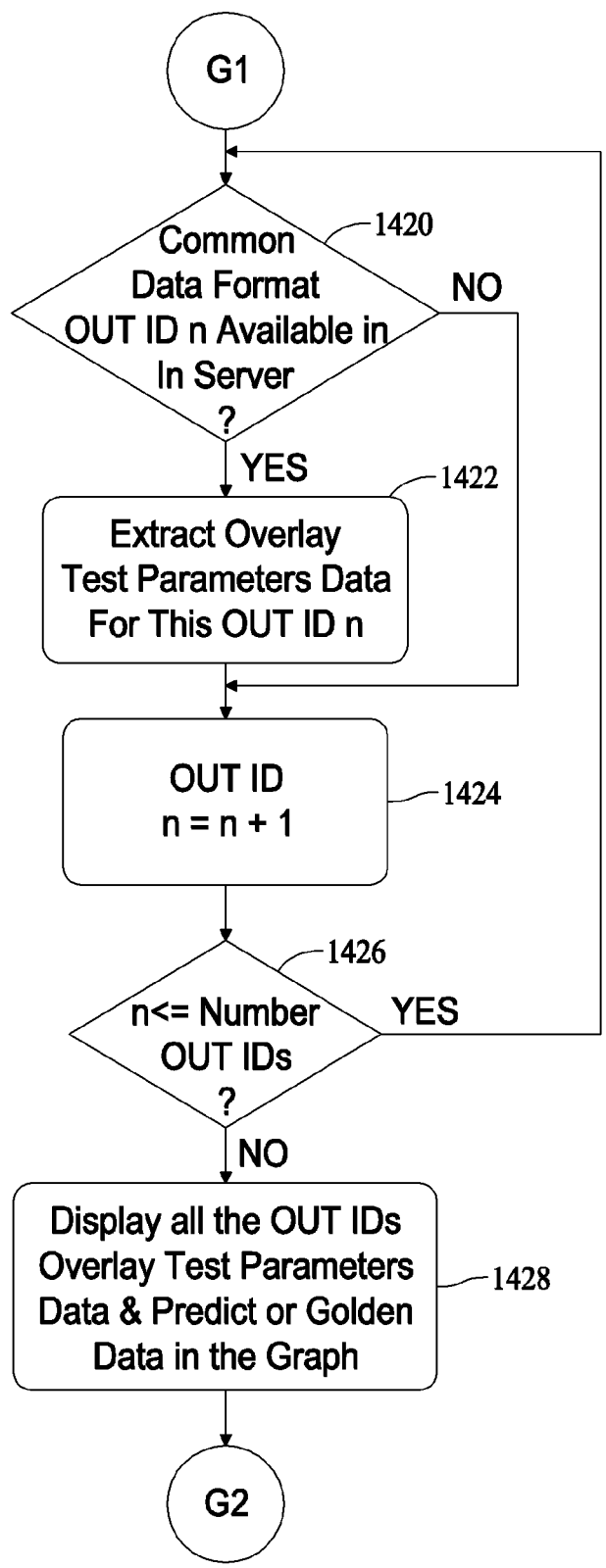
Figure 18:
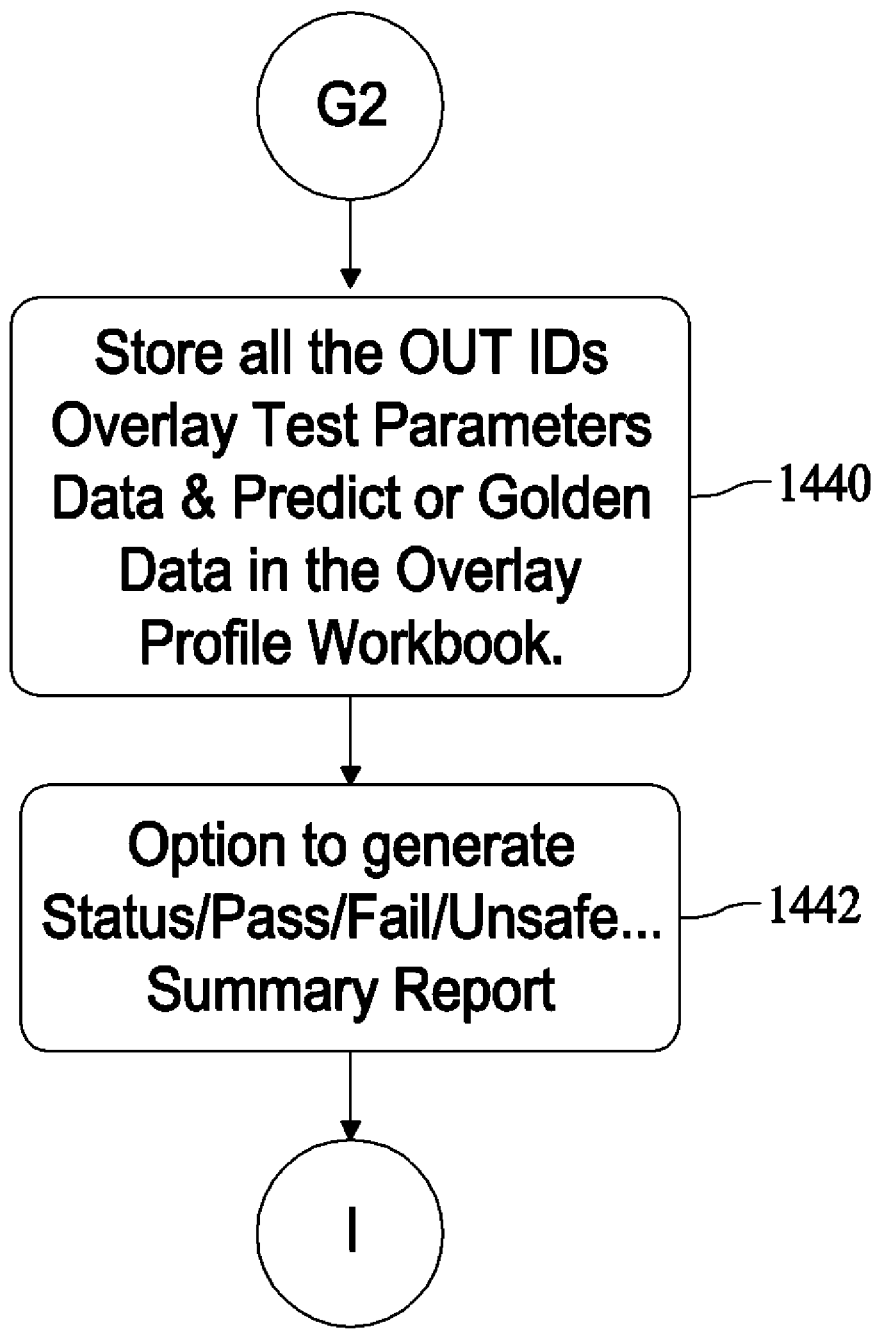

FIGS. 16-18 are flowcharts that illustrate one embodiment of a process 1400 for generating an overlay profile. Referring to FIG. 16, object under test identifiers are selected 1402 and displayed, and unit under test identifiers are selected 1404 and displayed. Test characterization identifiers are selected 1406 and displayed. A counter is set 1410 to one and is associated with the identifier for a first object under test.

Continuing to FIG. 17, a test is performed to determine if data associated with the object under test identified by the counter setting is available 1420 on the server in a common data format. If so, overlay test parameters data is extracted 1422 for the object under test identified by the counter setting, then the counter setting is incremented 1424. If not, no data extraction occurs, and the counter setting is incremented 1424. A check is performed to determine 1426 if the counter setting is less than or equal to the number of object under test identifiers. If so, the previously described steps are repeated for the next object under test identifier. If not, the overlay test parameters data is displayed 1428 for all the object under test identifiers from which a prediction regarding the overlay test parameters data for future objects under test can be made or golden overlay test parameters can be selected.

Now referring to FIG. 18, overlay test parameters data is stored 1440 in an overlay profile workbook for all the object under test identifiers as well as any predictions regarding the overlay test parameters data for future objects under test and any selected golden overlay test parameters. A user may then select 1342 to generate overlay test summary reports for the objects under test including such information as status, pass, fail, unsafe, etc.

Figure 19:
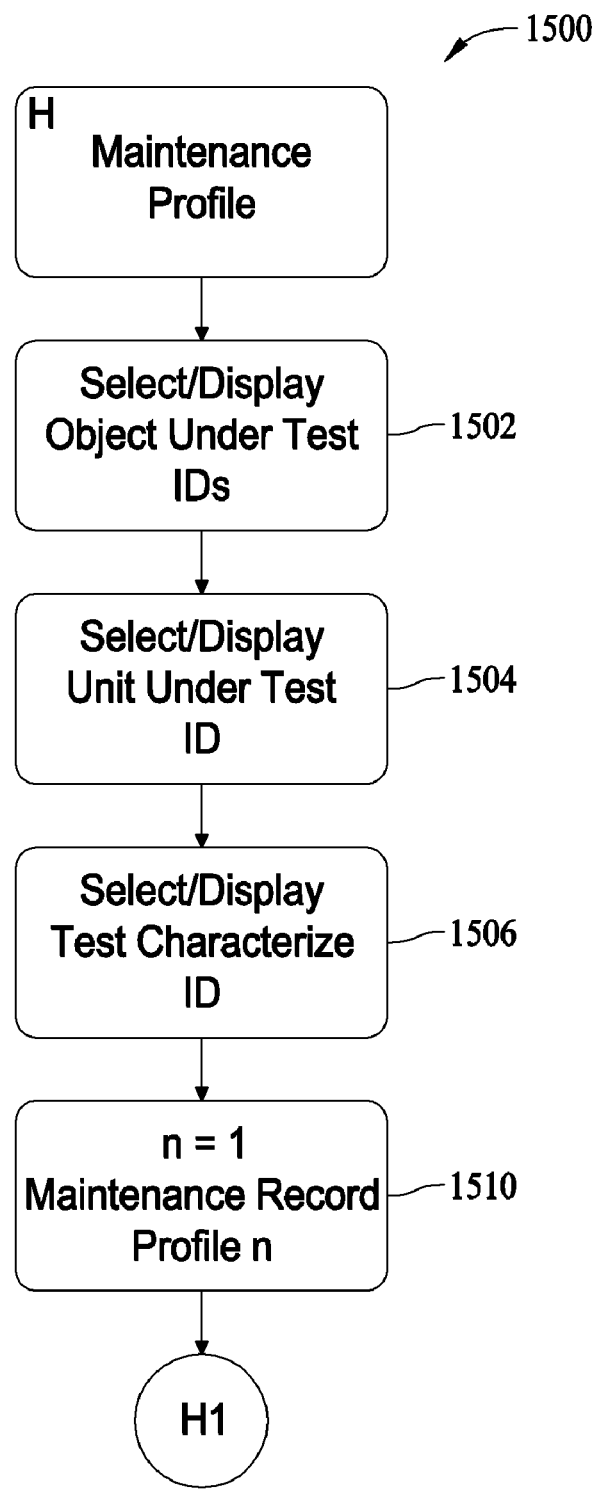
FIGS. 19-21 are flowcharts that illustrate one embodiment of a process for generating a maintenance profile.
Figure 20:
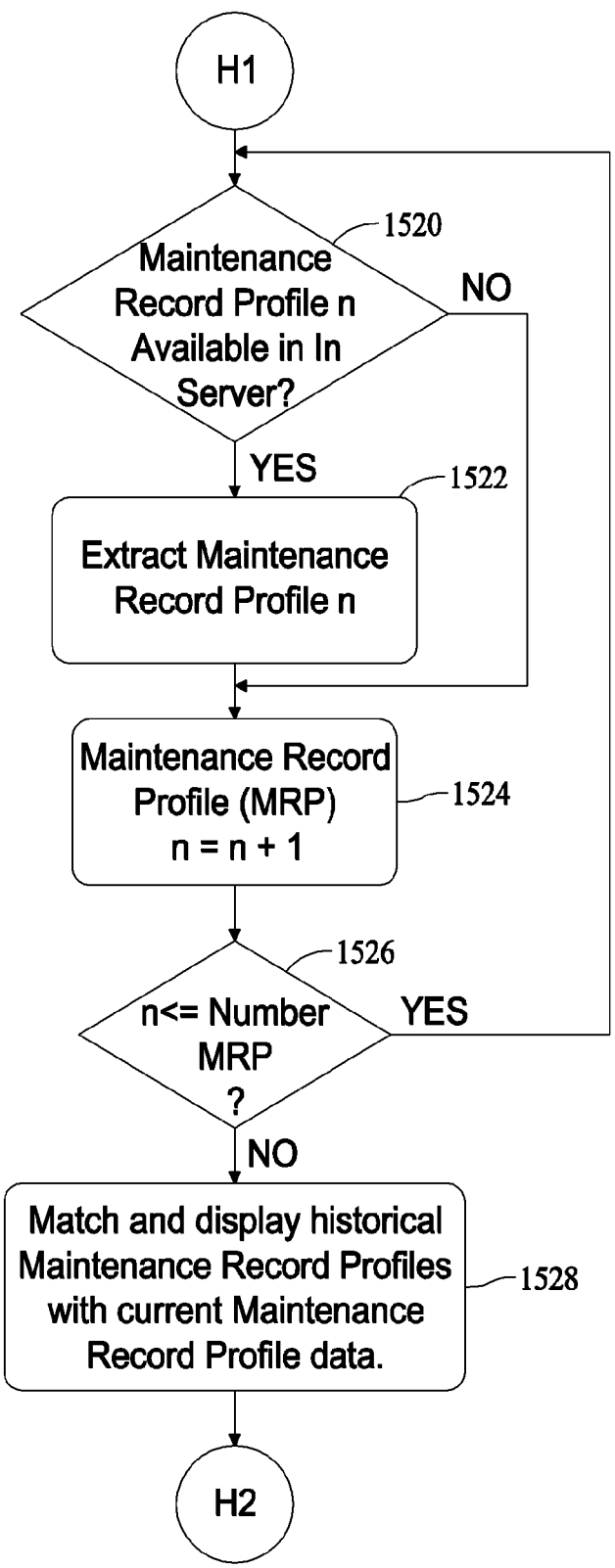
Figure 21:
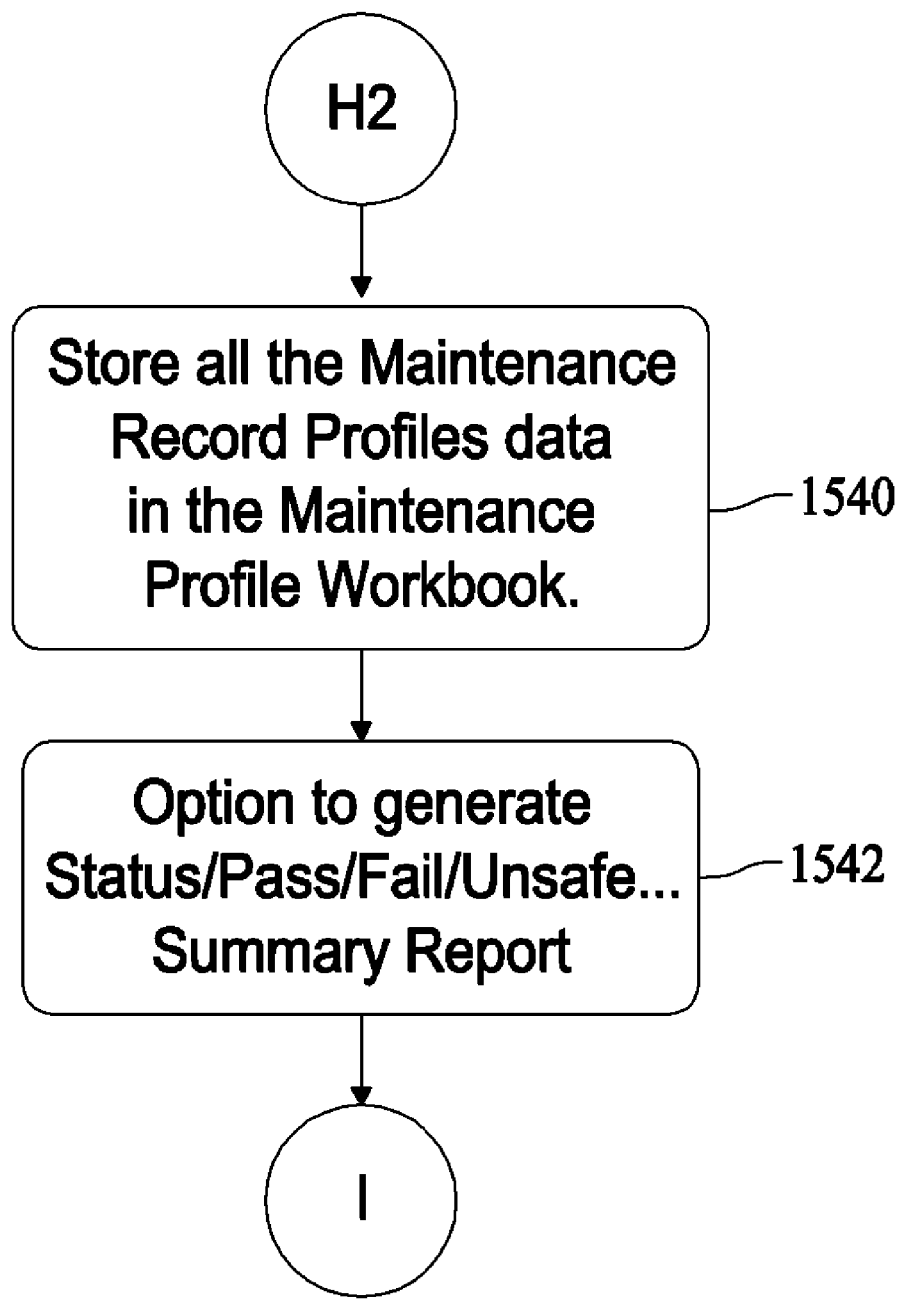

FIGS. 19-21 are flowcharts that illustrate one embodiment of a process 1500 for generating a maintenance profile. Referring to FIG. 19, object under test identifiers are selected 1502 and displayed, and unit under test identifiers are selected 1504 and displayed. Test characterization identifiers are selected 1506 and displayed. A counter is set 1510 to one and is associated with the identifier for a first object under test.

Continuing to FIG. 20, a test is performed to determine if a maintenance record profile associated with the object under test identified by the counter setting is available 1520 on the server. If so, the maintenance record profile data is extracted 1522 for the maintenance record profile identified by the counter setting, then the counter setting is incremented 1524. If not, no data extraction occurs, and the counter setting is incremented 1524. A check is performed to determine 1526 if the counter setting is less than or equal to the number of object under test identifiers. If so, the previously described steps are repeated for the next maintenance record profile. If not, historical maintenance record profiles are matched and displayed 1528 with the current maintenance record profile data.

Now referring to FIG. 21, all the maintenance record profile data is stored 1540 in an maintenance profile workbook. A user may then select 1542 to generate maintenance profile summary reports for the maintenance profiles including such information as status, pass, fail, unsafe, etc.

The benefits in the described embodiments are due to the fact that in the past there has no available automated tool to extract and compare the test data of one object to the another object in the same family, such as a satellite or aircraft family. The described embodiments automate this process and bring prior knowledge is brought to bear on the problems found through the testing of objects under test via an automated study of the repeatability of units/system testing.

The embodiment provide a capability such that graphical plots that include historical data, so called "golden data" and current test data can be generated, thereby helping a user to visualize and identify the status of current test data. In one embodiment, immediate access to historical test run can be gathered, some of which can be considered golden data sets. Historical data can be across families. For example, when the objects under test are satellites, this type of historical satellite data has heretofore been unavailable due to size restraints, would generally not be available online, and would need to be loaded from some long term data storage media such as tapes, which is a time consuming process.

One embodiment of the system described herein is distributed over a number of servers and utilizes a distributed database. The database is able to retrieve the raw data using filters and while also performing trend and overlay analysis where overlay analysis includes system level results and trend analysis is performed at the unit test level.

The embodiments are operable using both static testing as well as, for example, flight generated data. The use of filters ensures that only data of interest is extracted from the historical data library. By loading only data of interest into the database it is possible to achieve rapid access and high speed performance. Only the data needed for a given analysis set is promoted from the historical library due to the filtering available. In one embodiment, a common data format is used for each object, making use of a common translator possible.

This written description uses examples to disclose certain embodiments, including a best mode, and also to enable any person skilled in the art to practice these and other embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An automated data mapping and analysis method comprising:
   receiving, at a processing device, test data from a plurality of test objects at a data storage facility incorporating a computer memory;
   selecting, for receipt by the processing device, a test environment and analysis parameters from a user interface;
   retrieving a portion of the test data from the data storage facility based on the selected test environment and analysis parameters;
   ensuring, with the processing device, the retrieved test data is in a common format; and
   analyzing the retrieved test data to generate, with the processing device, at least one of a trending profile, an overlay profile, and a maintenance profile for the test objects for the selected analysis parameter;
   wherein analyzing the retrieved test data to generate a trending profile comprises comparing test result data from at least one previously tested object under test to that of a current object under test, and wherein analyzing the retrieved test data to generate an overlay profile comprises displaying test result data from at least one previously tested object under test with respect to that of a current object under test.

2. A method according to claim 1 wherein the test data includes at least one of manufacturing test data and operational data for an object under test.

3. A method according to claim 1 wherein receiving test data from a plurality of test objects at a data storage facility comprises receiving the test data via a network operationally connected to a data storage server.

4. A method according to claim 1 wherein selecting a test environment comprises:
   determining if a test environment table is available;
   loading and displaying an available test environment table; and
   creating a test environment table if one is not available.

5. A method according to claim 1 wherein selecting a test environment comprises selecting at least one of an interface connectivity, object under test identifiers, model identifiers, test environment identifiers, a listing of object under test identifiers, and test characterization identifiers.

6. A method according to claim 1 wherein selecting analysis parameters comprises:
   determining if an analysis parameters table is available;
   loading and displaying an available analysis parameters table; and
   creating an analysis parameters table if one is not available.

7. A method according to claim 1 wherein selecting analysis parameters comprises selecting at least one of a listing of the units for an object under test and test parameter identifiers.

8. A method according to claim 1 further comprising at least one of:
   storing trending test parameters data in a trending profile workbook for all the object under test identifiers;
   storing predictions regarding trending test parameters data for future objects under test; and
   generating trending test summary reports for the objects under test.

9. A system for automated data mapping and analysis, said system comprising:
   a computer comprising a user interface; and
   a data storage facility communicatively coupled to said computer, said computer programmed to:
   receive test data from a plurality of test objects;
   store the test data within said data storage facility;
   receive, via said user interface, a user selection of a test environment and analysis parameters;
   retrieve a portion of the test data from said data storage facility, based on the selected test environment and analysis parameters; and
   analyze the retrieved test data to generate at least one of a trending profile, an overlay profile, and a maintenance profile for the test objects based on the selected analysis parameters;
   wherein said computer is programmed to compare test result data from at least one previously tested object under test to that of a current object under test to analyze the retrieved test data to generate the trending profile.

10. A system according to claim 9 wherein said computer is programmed to convert the retrieved test data into a common data format.

11. A system according to claim 9 wherein to retrieve a portion of the test data from said data storage facility, said computer is programmed to:
    determine if a test environment table is available;
    load and display an available test environment table; and
    create a test environment table if one is not available.

12. A system according to claim 9 wherein to receive a user selection of a test environment, said computer is programmed to receive selections of at least one of an interface connectivity, object under test identifiers, model identifiers, test environment identifiers, a listing of object under test identifiers, and test characterization identifiers.

13. A system according to claim 9 wherein to retrieve a portion of the test data from said data storage facility, said computer is programmed to:
    determine if an analysis parameters table is available;
    load and display an available analysis parameters table; and
    create an analysis parameters table if one is not available.

14. A system according to claim 9 wherein to receive a user selection of analysis parameters, said computer is programmed to receive selections of at least one of a listing of the units for an object under test and test parameter identifiers.

15. A system according to claim 9 wherein said computer is programmed for at least one of:
    storing trending test parameters data in a trending profile workbook in said data storage facility for all the object under test identifiers;
    storing predictions in said data storage facility regarding trending test parameters data for future objects under test; and
    generating trending test summary reports for the objects under test.

16. A system for automated data mapping and analysis, said system comprising:
- a computer comprising a user interface; and
- a data storage facility communicatively coupled to said computer, said computer programmed to:
- receive test data from a plurality of test objects;
- store the test data within said data storage facility;
- receive, via said user interface, a user selection of a test environment and analysis parameters;
- retrieve a portion of the test data from said data storage facility, based on the selected test environment and analysis parameters; and
- analyze the retrieved test data to generate at least one of a trending profile, an overlay profile, and a maintenance profile for the test objects based on the selected analysis parameters; wherein said computer is programmed to display test result data from at least one previously tested object under test with respect to that of a current object under test to analyze the retrieved test data to generate the overlay profile.

17. A system according to claim 16 wherein said computer is programmed to convert the retrieved test data into a common data format.

18. A system according to claim 16 wherein to retrieve a portion of the test data from said data storage facility, said computer is programmed to:
- determine if a test environment table is available;
- load and display an available test environment table; and
- create a test environment table if one is not available.

19. A system according to claim 16 wherein to receive a user selection of a test environment, said computer is programmed to receive selections of at least one of an interface connectivity, object under test identifiers, model identifiers, test environment identifiers, a listing of object under test identifiers, and test characterization identifiers.

20. A system according to claim 16 wherein to retrieve a portion of the test data from said data storage facility, said computer is programmed to:
- determine if an analysis parameters table is available;
- load and display an available analysis parameters table; and
- create an analysis parameters table if one is not available.

21. A system according to claim 16 wherein to receive a user selection of analysis parameters, said computer is programmed to receive selections of at least one of a listing of the units for an object under test and test parameter identifiers.

* * * * *